United States Patent
Cloonan et al.

(10) Patent No.: US 11,394,523 B2
(45) Date of Patent: Jul. 19, 2022

(54) ECHO CANCELLER TRAINING IN FULL DUPLEX NETWORKS

(71) Applicant: ARRIS Enterprises LLC, Suwanee, GA (US)

(72) Inventors: Thomas J. Cloonan, Lisle, IL (US); Ayham Al-Banna, Lisle, IL (US); Francis Joseph O'Keeffe, Cork (IE)

(73) Assignee: ARRIS Enterprises LLC, Suwanee, GA (US)

( * ) Notice: Subject to any disclaimer, the term of this patent is extended or adjusted under 35 U.S.C. 154(b) by 50 days.

(21) Appl. No.: 17/104,871

(22) Filed: Nov. 25, 2020

(65) Prior Publication Data

US 2021/0160041 A1    May 27, 2021

Related U.S. Application Data

(60) Provisional application No. 62/940,662, filed on Nov. 26, 2019.

(51) Int. Cl.
*H04W 4/00*    (2018.01)
*H04L 5/14*    (2006.01)
(Continued)

(52) U.S. Cl.
CPC .......... *H04L 5/14* (2013.01); *H04L 25/03006* (2013.01); *H04W 72/1268* (2013.01)

(58) Field of Classification Search
CPC ... H04W 28/04; H04W 72/04; H04W 72/042; H04W 88/08; H04W 72/1268;
(Continued)

(56) References Cited

U.S. PATENT DOCUMENTS 6,266,367 B1 * 7/2001 Strait ................. H03H 21/0012
375/229
6,317,419 B1 * 11/2001 Olafsson ............. H04L 25/4927
370/292
(Continued)

FOREIGN PATENT DOCUMENTS

EP    0366584 A2    5/1990

OTHER PUBLICATIONS

International Search Report and Written Opinion Re: Application No. PCT/US2020/062354 (dated Mar. 16, 2021).

*Primary Examiner* — Phuongchau Ba Nguyen
(74) *Attorney, Agent, or Firm* — Chernoff, Vilhauer, McClung & Stenzel, LLP (57) ABSTRACT

In some embodiments, a method receives a first signal that is sent in a first direction in a network. Communications in the network are full duplex communications in a same frequency band. The first signal is amplified in the first direction. The method trains a first echo canceller to cancel a first echo signal from the first signal where the first echo signal is received in a second direction. After training the first echo canceller, the trained first echo canceller is enabled. The method receives a second signal in the second direction that is sent in the second direction in the network. The second signal is amplified in the second direction. The method trains a second echo canceller to cancel a second echo signal received in the first direction from the second signal where the first echo canceller cancels the first echo signal that is received in the second direction.

20 Claims, 9 Drawing Sheets

(51) Int. Cl.
*H04L 25/03* (2006.01)
*H04W 72/12* (2009.01)

(58) Field of Classification Search
CPC ... H04L 5/0007; H04L 5/14; H04L 25/03006; H04B 3/23
See application file for complete search history.

(56) References Cited

U.S. PATENT DOCUMENTS

| | | | |
|---|---|---|---|
| 6,792,040 B1* | 9/2004 | Davis | H04M 11/06 375/222 |
| 6,912,209 B1* | 6/2005 | Thi | H04L 65/1069 370/290 |
| 11,165,463 B1* | 11/2021 | Williams | H04B 10/2575 |
| 2003/0156632 A1* | 8/2003 | Dowling | H04L 25/03878 375/222 |
| 2018/0343033 A1 | 11/2018 | Sun et al. | |
| 2019/0081661 A1* | 3/2019 | Krapp | H04L 5/1461 |
| 2019/0190684 A1* | 6/2019 | Bowler | H04L 12/2801 |

* cited by examiner

ECHO CANCELLER TRAINING IN FULL DUPLEX NETWORKS

CROSS REFERENCE TO RELATED APPLICATIONS

This application claims the benefit of U.S. Provisional Patent Application No. 62/940,662, entitled "ECHO CANCELLER TRAINING IN FULL DUPLEX NETWORKS," filed Nov. 26, 2019, which application is hereby incorporated by reference herein.

BACKGROUND

A full duplex network allows downstream (DS) and upstream (US) signals to be sent within a same frequency spectrum on a network. For example, full duplex Data Over Cable Service Interface Specification (DOCSIS) allows a multiple service operator (MSO) to offer symmetrical services within a frequency spectrum on the network, such as a hybrid fiber coaxial network, to modems. One characteristic of the network is that it is a single-point to multi-point network where multiple modems are connected to a single node through the same network portion, also referred to as the plant. The node transmits the downstream signals to the multiple modems and also receives the upstream signals from the modems connected to the plant.

One of the requirements of a full duplex DOCSIS network was that the network should be an N+0 architecture, which means the fiber node that contains the FDX-capable remote physical device (RPD) is followed only by passive equipment. That is, no amplifiers are placed between the node and the modems. However, when an N+0 architecture is used, it is very costly because the number of subscribers that are serviced by a node in the N+0 architecture is small. In contrast, using an amplifier in between the node and the modems in an N+1/N+2/N+x network (where x is the maximum number of amplifiers in series subtending from the node) allows a node to service more subscribers and becomes more cost efficient. When inserting an amplifier in between the node and the subscribers, echo may result in both directions of the upstream direction and the downstream direction at the amplifier. That is, downstream signals may be coupled or reflected into the upstream path and upstream signals may be coupled or reflected into the downstream path. It may be hard to train the amplifier to cancel the upstream and downstream interference simultaneously while simultaneously amplifying the downstream and the upstream signals.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for an amplifier system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

An amplifier in a full duplex network may receive upstream signals from a network device (e.g., a modem) that are destined for a node upstream and receive downstream signals from a node that are destined for the network device downstream. Both the downstream signals and the upstream signals may be sent in a same frequency band. The amplifier experiences echo from both the upstream signal and the downstream signal simultaneously because of the full duplex nature of the network. That is, downstream signals sent in a frequency range may cause echo in upstream signals sent in the same frequency range, and vice versa. When amplifying the downstream signal and the upstream signal simultaneously, the echo from the upstream signal and the downstream signal needs to be cancelled. The amplifier may include a downstream echo canceller to cancel the echo from the downstream signal and an upstream echo canceller to cancel the echo from the upstream signal. In some embodiments, the downstream echo canceller may be trained to cancel the downstream echo signal. After training the downstream echo canceller, then the upstream echo canceller may be trained while the trained downstream echo canceller is enabled. The following will describe a process to train the downstream echo canceller and the upstream echo canceller.

System Overview

Figure 1:
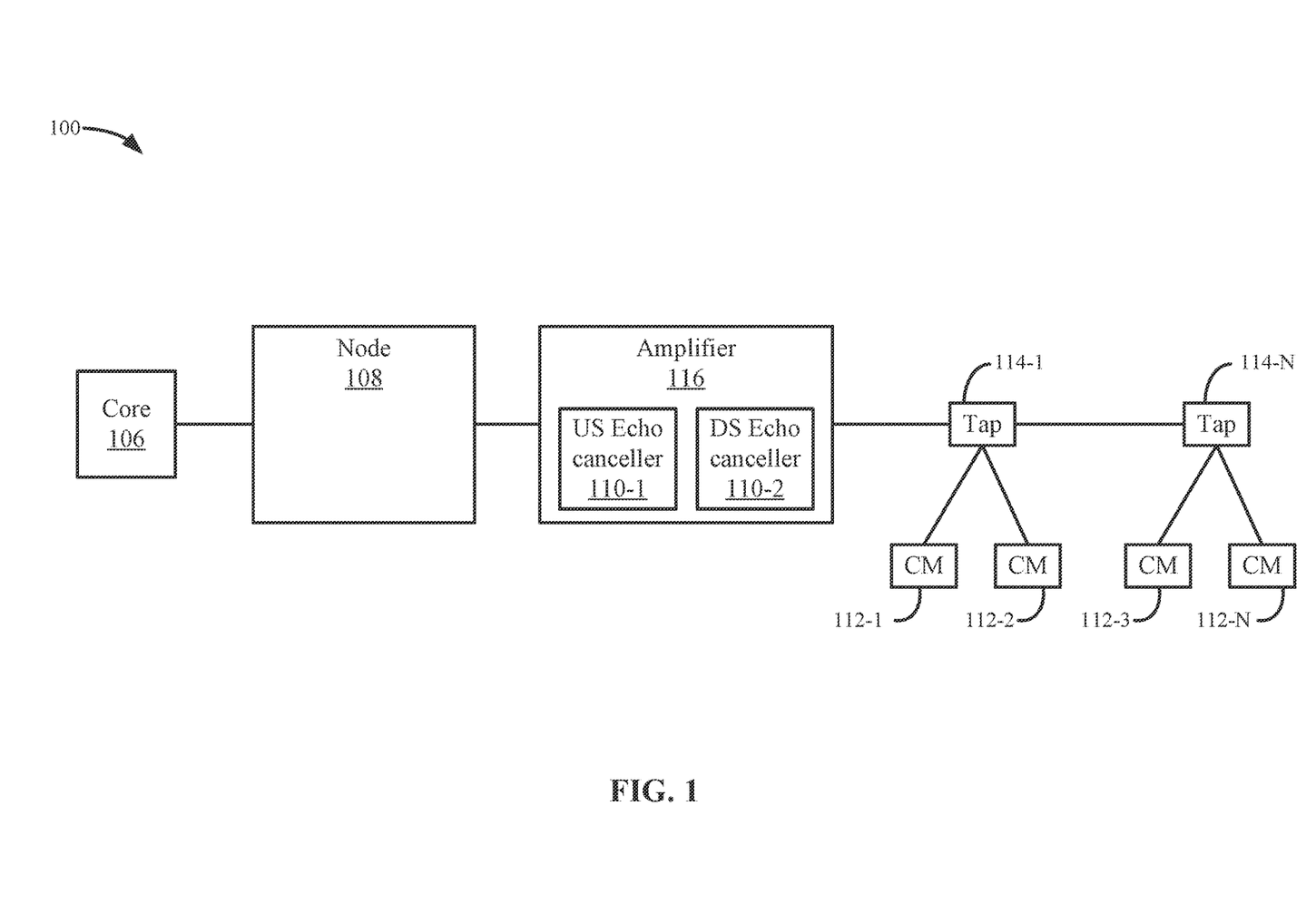
FIG. 1 depicts a simplified system for training and operating echo cancellers according to some embodiments.

FIG. 1 depicts a simplified system 100 for training and operating echo cancellers 110 according to some embodiments. A network in system 100 includes a core 106, a node 108, taps 114-1 to 114-N, and network devices 112-1 to 112-N. Network devices 112 will be referred to as modems, such as cable modems (CM), but other types of network devices that can send and receive signals may be used, such as gateways, customer premise equipment (CPE), set top boxes, etc. Cable modems 112 are configured to receive data in the downstream direction from core 106, and provide the data to a subscriber device, such as a set-top box, television, smart phone, etc. Also, cable modems 112 are configured to receive data from a subscriber device and provide the data in the upstream direction to node 108. As such, cable modem 112 may be an interface with the network outside of a subscriber's premises.

In some embodiments, the network provides data over a cable system according to a protocol, such as the DOCSIS protocol. The network may be based on different physical topologies, such as a hybrid fiber coaxial network, but other networks may be used. In some embodiments, the network may be a remote physical network (R-PHY) in which physical layer-related circuitry is located in node 108, which is located closer to subscriber premises in the network than core 106. In some embodiments, a converged cable access platform (CCAP) core may be located in a headend and node 108 may include a remote physical device (RPD) that interfaces between cable modems 112 and core 106.

Core 106 contains media access control (MAC) signaling functions. Core 106 may send downstream signals through a digital network, such as a fiber network to node 108. Node 108 may convert the digital signals to analog signals and send those signals to cable modems 112-1 to 112-N. Node 108 may be an optical node device that may be located at the junction of the fiber and coaxial plants. That is, node 108 may receive digital signals via optical fiber, convert those signals to analog, such as radio frequency, and send the analog signals via coaxial cable to cable modems 112. Also, node 108 converts upstream analog signals, such as radio frequency signals, received over the coaxial cable from cable modems 112, to digital signals for transmission over the fiber network to core 106.

An amplifier 116 amplifies upstream signals from cable modems 112-1 to 112-N and amplifies downstream signals from core 106 that are received via node 108. Amplifier 116 may amplify the signals in the analog domain and the amplification may increase a magnitude of a signal. Amplifier 116 may be located in between node 108 and taps 114. In addition to performing the amplification, amplifier 116 includes upstream echo canceller 110-1 and a downstream echo canceller 110-2.

Upstream echo canceller 110-1 cancels an echo (referred to as upstream echo signals) that results from transmitting the upstream signal and downstream echo canceller 110-2 cancels the echo (referred to as downstream echo signals) that results from transmitting a downstream signal. An echo signal may be a signal that reflects back in an opposite direction when a signal is being sent by amplifier 116 to node 108 or cable modem 112. The following will describe different training processes such that upstream echo canceller 110-1 and downstream echo canceller 110-2 can be trained to cancel upstream echo signals and downstream echo signals when used in a full duplex network.

Frequency Spectrum

Figure 2:
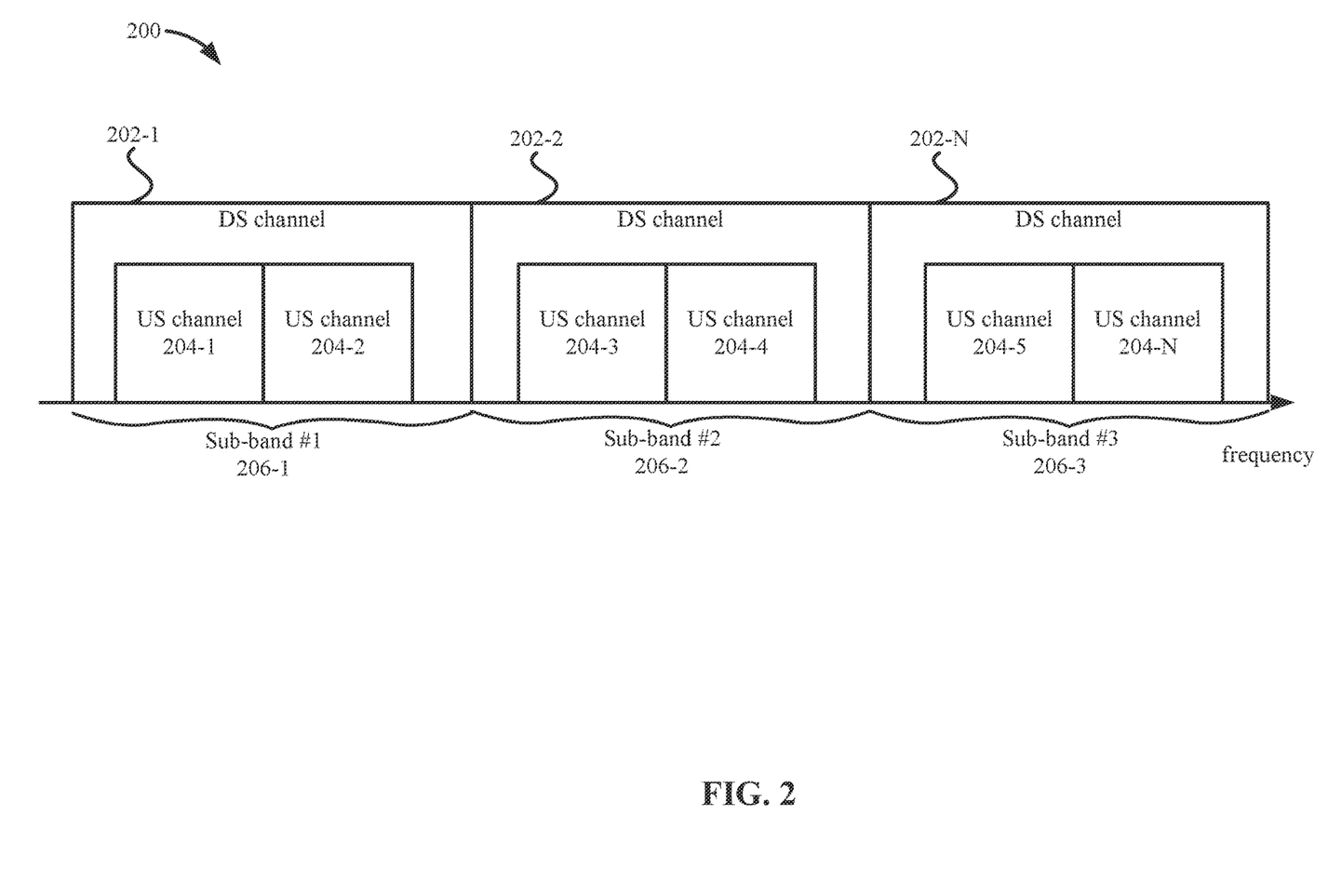
FIG. 2 depicts a frequency spectrum according to some embodiments.

The echo may occur in a full duplex network that transmits upstream signals and downstream signals in a same frequency spectrum. FIG. 2 depicts a frequency spectrum 200 according to some embodiments. Frequency spectrum 200 may be a range of frequencies in which downstream signals are received at cable modems 112 and upstream signals are sent from cable modems 112. Frequency spectrum 200 may be broken into different granularities of frequency ranges, such as sub-bands, channels, and sub-carriers. A sub-band may be a fixed portion of spectrum. A channel may be a portion of electromagnetic spectrum within a sub-band that is used to convey one or more radio frequency signals. A sub-carrier may be one of a large number of closely-spaced or overlapping orthogonal narrow-band width data signals within a channel, such as an Orthogonal Frequency Division Multiplexing (OFDM) channel.

In some embodiments, frequency spectrum 200 is broken into sub-bands 206-1 to 206-3, which are a first division of the frequency spectrum (e.g., a range of frequencies). A different number of sub-bands may be used and the number is not limited to three sub-bands. A sub-band 206 may be broken into channels. For example, a channel may include a downstream (DS) channels 202-1, 202-2, . . . 202-N in which downstream signals are sent. Also, a channel may include upstream (US) channels 204-1 to 204-N in which upstream signals can be sent.

Each channel may be a second division of frequencies in frequency spectrum 200. For example, each channel may have a frequency spectrum that is equal to or less than the frequency spectrum of a sub-band. As shown, a sub-band includes one downstream channel 202 and two upstream channels 204; however, a sub-band may include different numbers of downstream channels 202 and upstream channels 204. But, at least one downstream channel and at least one upstream channel overlap in frequency in a sub-band 206. For example, downstream channel 202-1 is in a first frequency range in which downstream signals are sent from core 106 to cable modems 112. In some embodiments, downstream channel 202-1 uses the same frequency range as sub-band #1. Within downstream channel 202-1, upstream channels 204-1 and 204-2 are used by cable modems 112 to transmit upstream signals to core 106. In some embodiments, upstream channels 204 may occupy different subsets of the frequency spectrum in downstream channel 202-2. For example, upstream channel 204-1 is included in a first subset of frequencies in sub-band #1 and upstream channel 204-2 is included in a second subset of frequencies in sub-band #1. However, other configurations may be used. For example, an upstream channel may have the same or less than the frequency spectrum of a downstream channel. In other examples, any number of upstream channels 204 may be found in a downstream channel 202.

Frequency spectrum 200 may also be broken into other granularities, such as sub-carrier frequencies. For example, downstream channel 202 and upstream channel 204 may be broken into sub-carriers that are of a smaller range frequency. The sub-carriers are used to carry a signal in the upstream direction and the downstream direction. Accordingly, downstream channels 202 and upstream channels 204 may include multiple sub-carriers that are subsets of frequency spectrum 200 within the respective channel.

Amplifier

Figure 3:
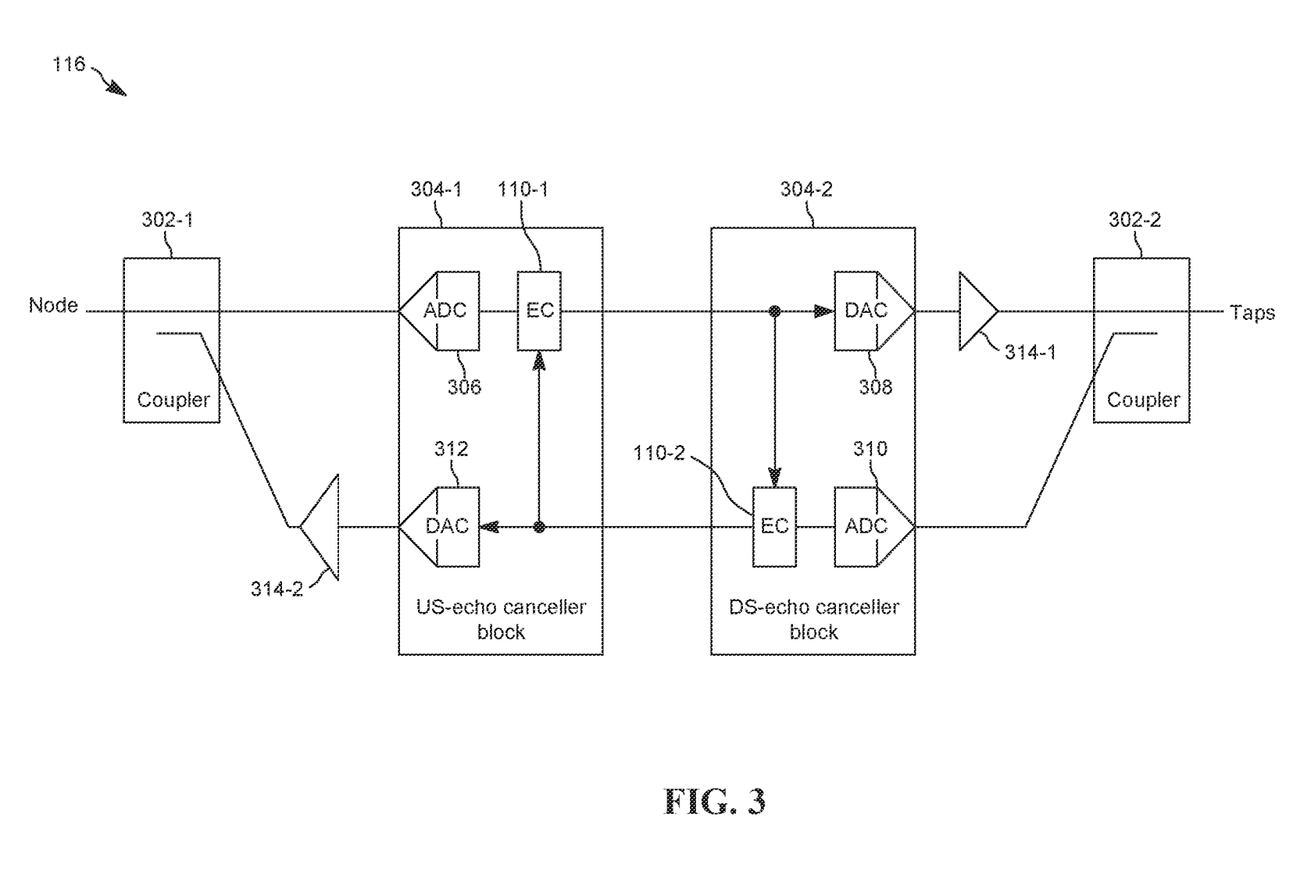
FIG. 3 depicts a more detailed example of an amplifier according to some embodiments.

FIG. 3 depicts a more detailed example of amplifier 116 according to some embodiments. Amplifier 116 includes couplers 302-1 and 302-2. Coupler 302-1 couples downstream signals from node 108 downstream and also couples upstream signals to node 108. Coupler 302-2 couples downstream signals to taps 114-1 to 114-N and also cable modems 112-1 to 112-N. Further, coupler 302-2 couples upstream signals from cable modems 112-1 to 112-N upstream towards node 108. Couplers 302-1 and 302-2 may be coupling signals in both the upstream direction and the downstream direction, which may result in echo in the respective opposite direction.

Amplifier 116 includes an amplifier 314-1 that amplifies downstream signals and an amplifier 314-2 that amplifies upstream signals. In some embodiments, downstream amplifier 314-1 may be smaller than upstream amplifier 314-2 in that upstream amplifier 314-2 may provide more amplification of an upstream signal. However, amplifiers 314-1 and 314-2 may amplify the downstream signal and the upstream signal, respectively, in different ways.

Amplifier 116 includes an upstream echo canceller block 304-1 and a downstream echo canceller block 304-2. Upstream echo canceller block 304-1 may cancel an echo that results from an upstream signal being sent through amplifier 314-2, which is reflected back as an upstream echo signal in the downstream path. Downstream echo canceller block 304-2 may cancel echo that results from a downstream signal being sent through amplifier 314-1, which is reflected back as a downstream echo signal in the upstream path.

In operation, downstream echo canceller block 304-2 receives a downstream signal at digital-to-analog converter (DAC) 308. Digital-to-analog converter 308 may convert a downstream signal from digital to analog and send the analog signal to amplifier 314-1, which amplifies the downstream signal. Coupler 302-2 receives the downstream signal in the same frequency band in which an upstream signal may be received from cable modems 112. The sending of the downstream signal may reflect back and become a downstream echo signal in the upstream direction (e.g., at a similar frequency of the downstream signal in the upstream frequency band) to analog-to-digital converter 310. The reflected downstream signal may corrupt upstream signals in the frequency band and should be cancelled. For example, echo canceller 110-2 is configured to cancel the downstream echo signal that results from the downstream signal being sent.

To cancel the downstream echo signal, echo canceller 110-2 receives a reference signal from the downstream signal before digital to analog converter 308 converts the signal to analog and also receives the downstream echo signal that is reflected from the downstream signal. Echo canceller 110-2 can then cancel the downstream echo signal based on the reference signal. For example, based on the characteristics of the downstream signal, such as the magnitude and phase of the reference signal, echo canceller 110-2 can attempt to remove the downstream echo signal from the upstream signal, such as by subtracting a magnitude and phase from the upstream signal that attempts to remove the downstream echo signal from the upstream signal. As will be discussed in more detail below, some embodiments train echo canceller 110-2 to be able to use the reference signal to cancel the downstream echo signal.

For the upstream echo signal, upstream echo canceller block 304-1 receives an upstream signal at digital-to-analog converter 312, which converts a digital signal to analog and outputs the analog signal. Amplifier 314-2 amplifies the upstream signal and sends the upstream signal to coupler 302-1. The amplified upstream signal may then be reflected back into the downstream direction as an upstream echo signal. The downstream signal includes the upstream echo signal in a frequency range similar to the upstream signal. The frequency range of the upstream echo signal may corrupt the downstream signal.

Analog-to-digital converter 306 receives the downstream signal and converts the analog signal to digital. Upstream echo canceller 110-1 then cancels the upstream echo signal. For example, upstream echo canceller 110-1 receives a reference signal from the upstream signal and uses the reference signal to calculate a magnitude and a phase of the upstream echo signal. As with echo canceller 110-2, echo canceller 110-1 is trained to use a reference signal to cancel a magnitude and a phase of the upstream echo signal.

Because upstream signals and downstream signals may be sent simultaneously in the same frequency ranges, processes to train both echo canceller 110-1 and echo canceller 110-2 to cancel the simultaneously sent signals are required. Because echo canceller 110-1 and echo canceller 110-2 may be both operating, training each echo canceller 110-1 and echo canceller 110-2 may be hard because a correlation between a reference signal and resulting echo signal is needed to train one of the echo cancellers, and the operation of one echo canceller may affect the training of the other. The following will describe the training of echo canceller 110-1 and echo canceller 110-2 in more detail. The training may be performed for the entire frequency band, different sub-bands, different channels, or selected portions of the frequency spectrum.

Echo Canceller Training

Figure 4:
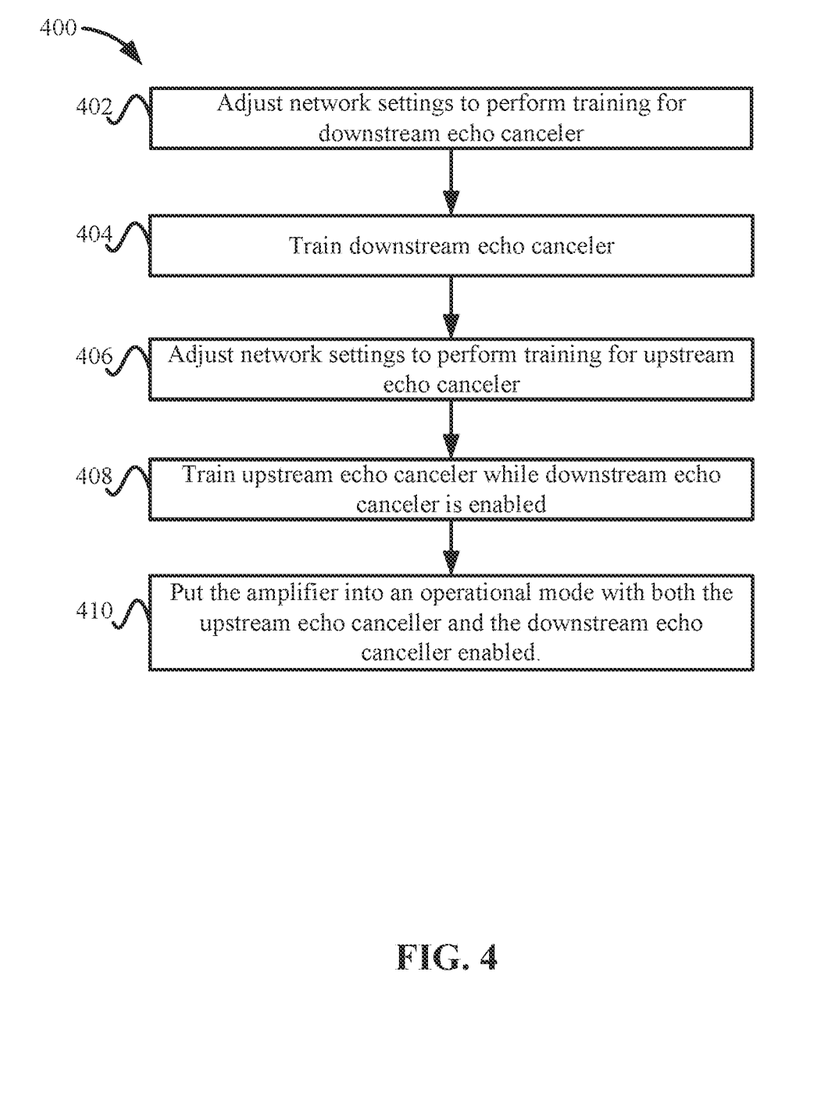
FIG. 4 depicts a simplified flowchart of a method for training echo cancellers according to some embodiments.

FIG. 4 depicts a simplified flowchart 400 of a method for training echo canceller 110-1 and echo canceller 110-2 according to some embodiments. It is noted that although downstream echo canceller 110-2 is trained first in this method, variations may be appreciated, such as upstream echo canceller 110-1 may be trained first.

The training of downstream echo canceller 110-2 will be described first. At 402, some embodiments adjust network settings to perform training for downstream echo canceller 110-2. For example, core 106 may set cable modems 112 to a first network setting to perform training of downstream echo canceller 110-2, such as a network setting to restrict upstream transmissions from cable modems 112. As will be described in more detail below, node 108 may send upstream idle grants that schedule times in which cable modems 112 do not transmit upstream.

At 404, downstream echo canceller 110-2 is trained. The training process of downstream echo canceller 110-2 will be described in more detail below.

After training downstream echo canceller 110-2, at 406, network settings to perform training of upstream echo canceller 110-1 are adjusted. Different network settings may be adjusted, such as switching modems 112 to the upstream direction such that modems 112 do not receive downstream transmissions. Then, node 108 may schedule a known upstream pattern from a modem 112. In other examples, the network setting for limiting upstream signals from cable modems 112 may not be set, which allows downstream transmissions to occur during the training process. However, not adjusting the network settings to restrict downstream signals may cause the training process to take longer. This is because the downstream signals may need to be averaged out over the training process to configure the echo cancellation. The presence of the downstream signals may affect the correlation between the reference signal and the received upstream echo signal.

At 408, upstream echo canceller 110-1 is trained while the trained downstream echo canceller 110-2 is enabled. Because downstream echo canceller 110-2 is enabled, the downstream coupled echo is being removed in the upstream direction. This allows upstream echo canceller 110-1 to be trained accurately and faster because the downstream echo signal is not present in the reference signal that is received at upstream echo canceller 110-1. The presence of the downstream echo signal may affect the correlation between the reference signal and the resulting upstream echo signal. Accordingly, training the downstream echo canceller first allows the upstream transmissions on the modems to be idled, which allows the correct training of the downstream echo canceller. It may be harder to idle the downstream signals if the upstream echo canceller was trained first.]

After training upstream echo canceller 110-1 and downstream echo canceller 110-2, at 410, amplifier 116 may be put into an operational mode to process both upstream and downstream signals with both upstream echo canceller 110-1 and downstream echo canceller 110-2 enabled. Upstream echo canceller 110-1 cancels an upstream echo signal and downstream echo canceller 110-2 cancels a downstream echo signal simultaneously in some embodiments.

The following will describe the training process in more detail.

Training of Downstream Echo Canceller

Figure 5A:
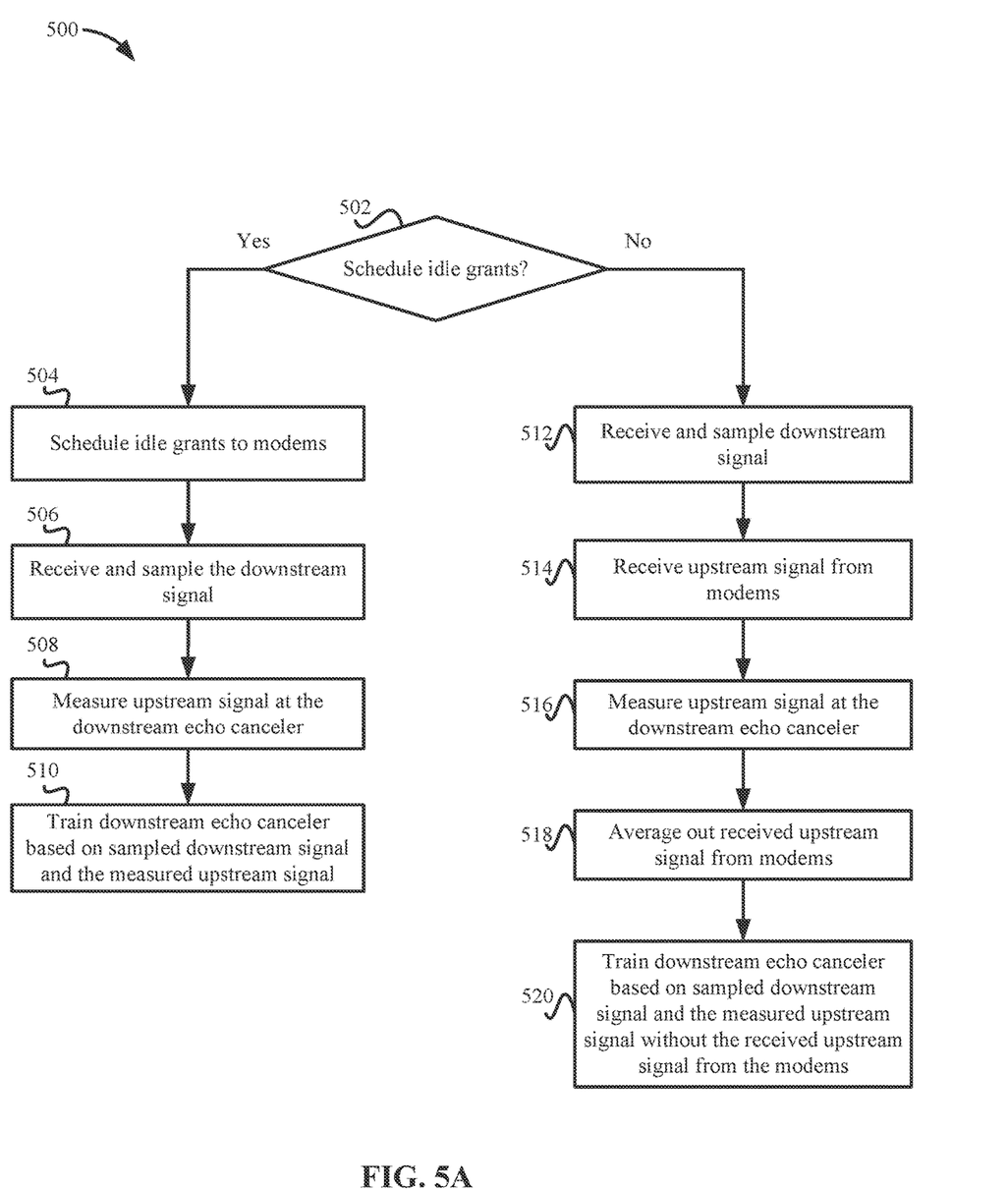
FIG. 5A depicts a simplified flowchart of a method for training a downstream echo canceller according to some embodiments.

FIG. 5A depicts a simplified flowchart 500 of a method for training downstream echo canceller 110-2 according to some embodiments. At 502, it is determined whether to schedule upstream idle grants. For example, node 108 may determine whether or not to schedule upstream idle grants to cable modems 112. The upstream idle grants may be quiet times in which upstream signals are not sent by cable modems 112. Idle grants allow amplifier 116 to minimize the effect of upstream echo signals because echo canceller 110-1 has not been trained yet and may not properly cancel upstream echo signals.

If it is determined the idle grants should be scheduled, at 504, node 108 schedules idle grants to cable modems 112. Then, amplifier 116 receives a downstream signal, which may be an analog signal that is sent from node 108. Analog-to-digital converter 306 converts the analog signal to digital. In some embodiments, because the idle grants have been sent, cable modems 112 are not transmitting upstream and upstream echo signals may not be present in the downstream direction. Then, at 506, downstream echo canceller block 304-2 receives and samples the downstream signal.

The downstream signal is then amplified at amplifier 314-1 and a downstream echo signal is reflected back into the upstream and received at analog-to-digital converter 310. Analog-to-digital converter 310 converts the analog signal to a digital signal. At 508, echo canceller 110-2 measures the upstream signal. Because upstream signals are not being sent by cable modems 112, the magnitude and phase of the upstream signal received at echo canceller 110-2 may be based on the downstream echo signal.

At 510, echo canceller 110-2 is trained based on the sampled downstream signal and the measured upstream signal. For example, echo canceller 110-2 can compare the samples downstream signal to the measured upstream signal and determine the downstream echo signal that results from the sampled downstream signal. This correlation allows downstream echo canceller 110-2 to receive a downstream signal and cancel the magnitude and phase of a predicted downstream echo signal that may result. The above process may be performed over a period of time in which the downstream signal is sampled and the upstream signal is measured at echo canceller 110-2. Eventually, the characteristics of the downstream signal can be used to predict the downstream echo signal that needs to be cancelled.

If upstream idle grants are not scheduled, at 512, downstream echo canceller block 304-2 receives and samples the downstream signal. At 514, downstream echo canceller block 304-2 receives an upstream signal from cable modems 112. The upstream signal from cable modems 112 may be in a same frequency range to the downstream signal that may be combined with the downstream echo signal. At 516, downstream echo canceller 110-2 measures the upstream signal. As discussed above, this upstream signal includes the upstream signal from cable modems 112 in addition to the downstream echo signal. At 518, echo canceller 110-2 averages out the received upstream signal from cable modems 112. This process may take a period of time to determine the characteristics of the upstream signal from cable modems 112 to average out. For example, over time, an averaged upstream signal that is being received from cable modems 112 may be determined. By averaging out the upstream signal from cable modems 112, echo canceller 110-2 can correlate the received downstream signal with the downstream echo signal. Accordingly, at 520, downstream echo canceller 110-2 is trained based on the sampled downstream signal and the measured upstream signal with the averaged out upstream signal from cable modems 112 removed. This training is the similar to the process as described above at 510 because the averaged out upstream signal from cable modems 112 is removed from the upstream signal. Because determining an average of the magnitude and the phase of upstream signal from cable modems 112 may take a period of time, the training without scheduling the upstream idle grants may take a longer period of time compared to when upstream idle grants are not scheduled.

Figure 5B:
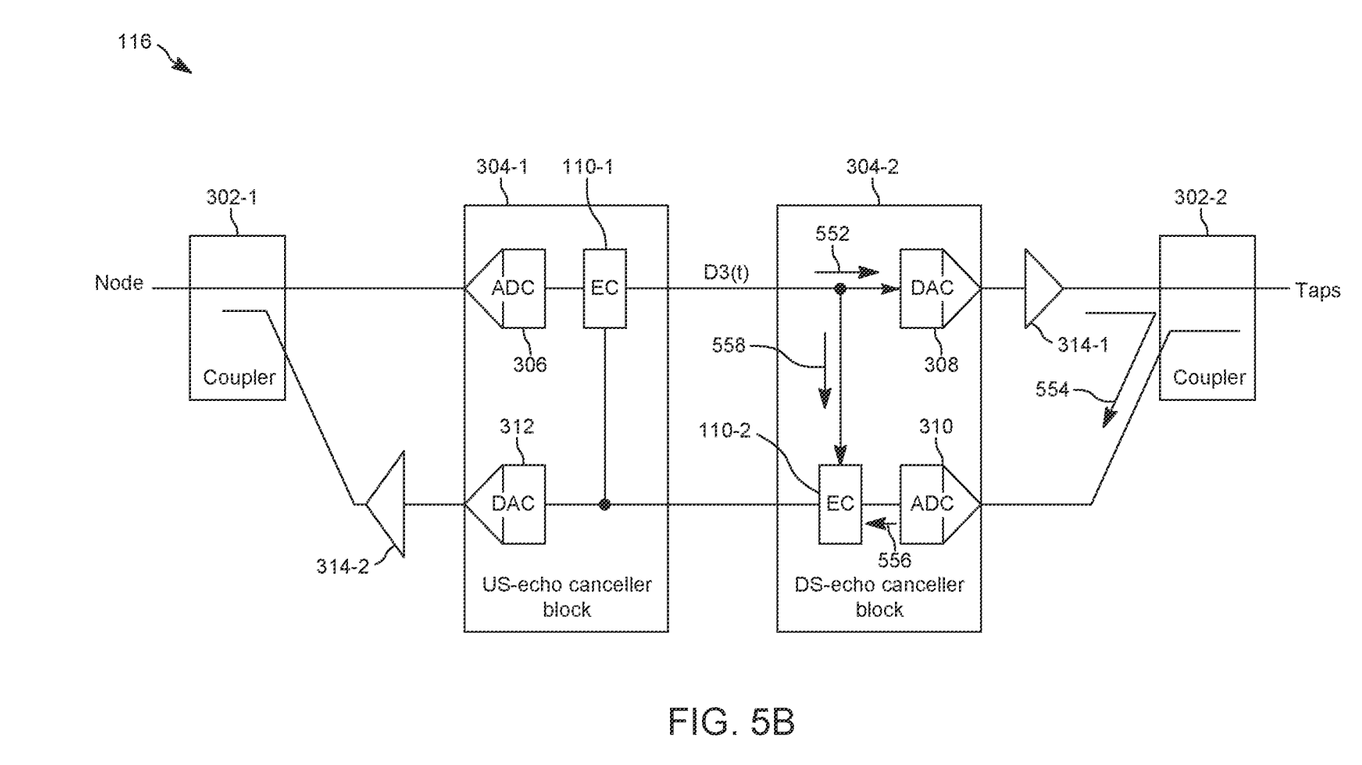
FIG. 5B depicts an example of the downstream echo cancellation training according to some embodiments.

FIG. 5B depicts an example of the downstream echo cancellation training according to some embodiments. At 552, the downstream signal is sampled in downstream echo canceller block 304-2. At 554, the downstream signal is sent downstream, but a downstream echo signal results and flows in the upstream direction. At 556, echo canceller 110-2 receives the upstream signal. Additionally, at 558, echo canceller 110-2 receives the downstream signal that was received at downstream echo canceller block 304-2. As discussed above, echo canceller 110-2 can cancel the downstream echo signal received at 556 based on the characteristics of the downstream signal received at 558.

Upstream Echo Cancellation

Figure 6A:
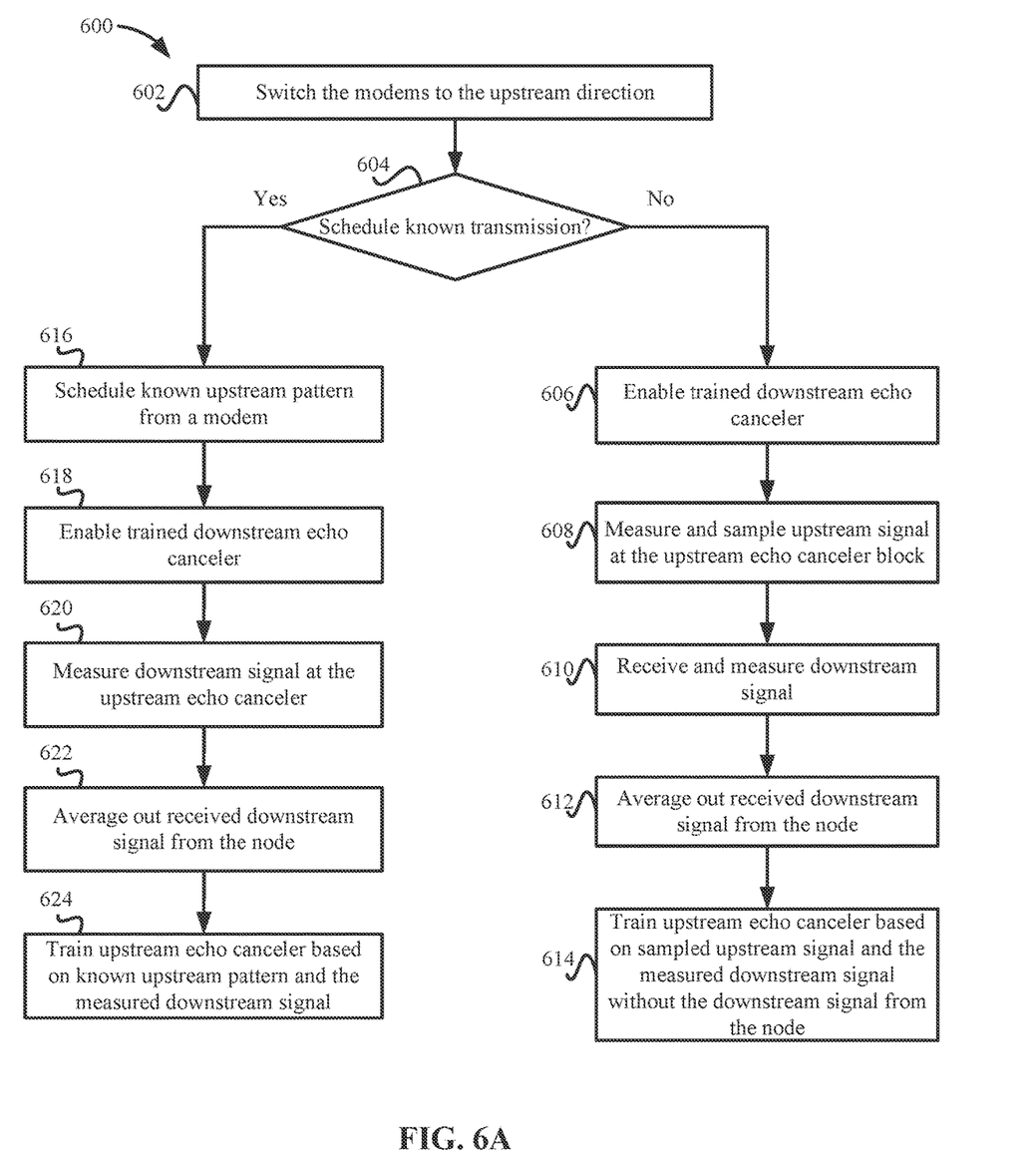
FIG. 6A depicts a simplified flowchart of a method of training an upstream echo canceller according to some embodiments.

After performing training of downstream echo canceller 110-2, training of upstream echo canceller 110-1 may be performed. FIG. 6A depicts a simplified flowchart 600 of a method of training upstream echo canceller 110-1 according to some embodiments. At 602, core 106 may switch cable modems 112 to the upstream direction. For example, core 106 (via node 108) may send a resource block assignment (RBA) message that specifies the direction of transmission as the upstream direction to cable modems 112. The resource block assignment message may assign blocks for cable modems 112 to transmit upstream instead of receiving downstream transmissions. During these block assignments, cable modems 112 are configured to transmit upstream. The resource block assignment messages may be sent to cable modems 112 that are connected to amplifier 116 and may be regardless of interference groups or transmission groups. That is, if cable modems 112 were in a different interference group, cable modems not in the same interference group could transmit in the upstream and downstream directions simultaneously because their signals do not interfere. In this example, core 106 schedules cable modems 112 to only transmit upstream, which restricts the downstream transmission to cable modems 112. That is, core 106 does not transmit downstream data to cable modems 112 when the resource block assignments are made.

Different methods of training upstream echo canceller 110-1 may be used. For example, a known upstream transmission may be used or not used. At 604, it is determined whether to schedule a known upstream transmission.

If a known transmission is not scheduled, at 606, downstream echo canceller 110-2 is enabled. Downstream echo canceller 110-2 has been enabled to remove downstream echo signals as trained. At 608, upstream echo canceller block 304-1 measures and samples the upstream signal. This signal is used as a reference to upstream echo canceller 110-1. At 610, upstream echo canceller 110-1 receives and measures the downstream signal. The downstream signal may include the upstream echo signal. At 612, echo canceller 110-1 may average out the received downstream signal from node 108. Downstream transmissions may have been stopped, but energy in the downstream direction may be received from node 108 as it transmits to other RF Legs. Upstream echo canceller 110-1 can determine the amount of downstream energy that exists in the downstream direction over time and average the downstream energy out when performing the training. Since the upstream signals (and upstream echoes) are uncorrelated with the downstream signal, estimating the coefficients of the upstream echo canceller can occur over a long period of time. Since the upstream signal will continue to exist during the training (cannot schedule idle downstream grants), the estimate may be noisy. However, if the estimator is running for a long enough time, the effect of the downstream echo will go away and the coefficients will converge (slowly). This will happen, again, because the downstream signal is uncorrelated with the upstream signal. In other embodiments, the upstream signal sends the same signal pattern over and over again and each copy of that repeated pattern as a unique upstream transmission of (ideally) the same waveform. Assume that N repeated patterns of that waveform are sent. The upstream echo comes back from these N repeated patterns mixed with downstream signals. If the N downstream signals are captured, they can be added together, and then the resultant signal is divided by N. This results in an average of the downstream signals. If N is large enough, the downstream signals should have random positive additions and random negative additions that roughly cancel out due to the action of the N additions. So the average result "cancels out" the downstream signals. This may require that the downstream echo canceller would have been already trained before the upstream echo canceller (to permit the repeated upstream signal patterns to arrive without corruption from the downstream echoes. Accordingly, at 614, upstream echo canceller 110-1 is trained based on a sample of the upstream signal and the measured downstream signal without the downstream energy that is received from node 108 present.

If a known pattern is to be scheduled, at 616, a cable modem 112 may schedule a known upstream pattern. The known upstream pattern may include known characteristics for the upstream signal.

At 618, downstream echo canceller 110-2 is enabled. In this case, any downstream echo signal is cancelled as trained at downstream echo canceller 110-2. Although the resource block assignment message restricted downstream data transmissions to cable modems 112, energy may still be found on the downstream direction. Downstream echo canceller 110-2 may cancel the echo that results from the downstream energy. This results in an upstream signal that is received at upstream echo canceller block 304-1 that does not include any downstream echo signal.

At 620, upstream echo canceller 110-1 measures the downstream signal. For example, the upstream signal may be amplified by amplifier 314-2 and is coupled into the downstream direction to upstream echo canceller 110-1. At 622, echo canceller 110-1 may average out the received downstream signal from node 108. Because the upstream pattern is known, echo canceller 110-1 can determine the received downstream signal by subtracting the known pattern. At 624, upstream echo canceller 110-1 is trained based on a known pattern of the upstream signal and the measured downstream signal without the downstream energy that is received from node 108 present.

Because the upstream pattern is known and can be used to remove any downstream echo signal, and downstream echo canceller 110-2 cancels any downstream echo that may be occurring, the training of upstream echo canceller 110-1 may be relatively quick. That is, a known upstream pattern is received and the corresponding upstream echo signal is received at echo canceller 110-1. Echo canceller 110-1 can perform the correlation between the known upstream pattern and the corresponding upstream echo signal. After a period of time and multiple measurements, echo canceller 110-1 can be trained to determine the amount of echo cancellation needed for an upstream signal that is received as a reference.

Figure 6B:
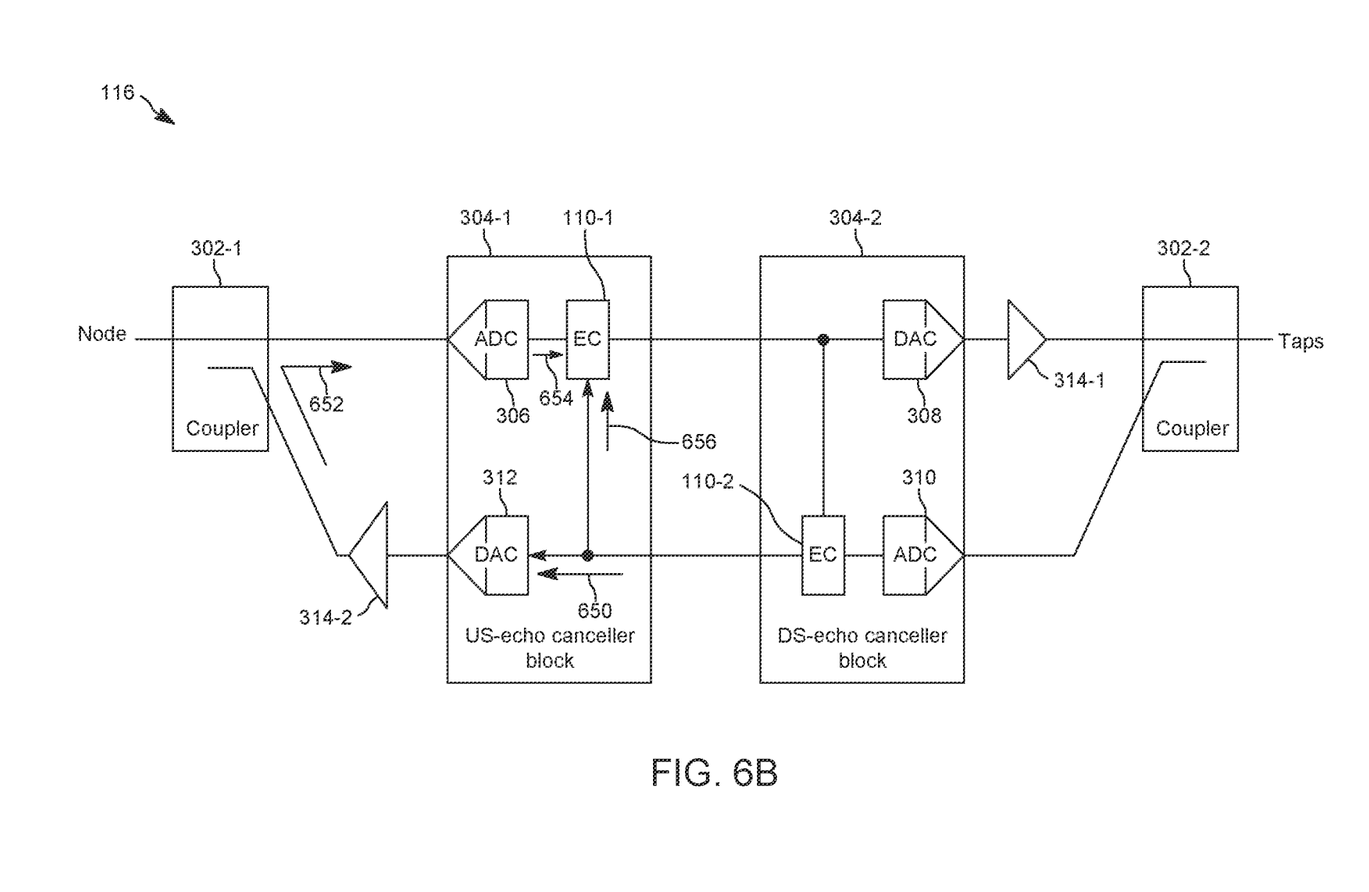
FIG. 6B shows an example of the upstream echo cancellation according to some embodiments.

FIG. 6B shows an example of the upstream echo cancellation according to some embodiments. At 650, upstream echo canceller block 304-1 receives the upstream signal. Amplifier 314-2 then amplifies the upstream signal. At 652, the upstream signal is coupled to the downstream direction as the upstream echo signal.

At 654, echo canceller 110-1 receives the upstream echo signal. At 656, echo canceller 110-1 also receives the original upstream transmission that is used as a reference. Upstream echo canceller 110-1 can then determine the correlation between the upstream signal received at 656 and the upstream echo signal received at 654. Echo canceller 110-1 may average out any downstream signal that is received from node 108 when performing the training.

Although the training described above trains downstream echo canceller 110-2 first, and then upstream echo canceller 110-1 next (with downstream echo canceller 110-2 enabled), it is possible to train upstream echo canceller 110-1 first, and then downstream echo canceller 110-2 second. When training upstream echo canceller 110-1 first, the upstream echo canceller 110-1 is trained to cancel the upstream echo signal based on the sampled upstream signal that is received at upstream echo canceller block 304-1. There may be some energy that exists in the downstream direction, but echo canceller 110-1 can average out the downstream energy that results. However, training downstream echo canceller 110-2 first, and then upstream echo canceller 110-1 next may be more efficient.

Conclusion

Accordingly, echo cancellation for amplifier 116 is provided in a way such that echo cancellers in both the downstream direction and the upstream direction can be trained when upstream echo and downstream echo signals result.

Embodiments

In some embodiments, a method comprising: receiving, by a computing device, a first signal that is sent in a first direction in a network, wherein communications in the network are full duplex communications in a same frequency band; amplifying, by the computing device, the first signal in the first direction; training, by the computing device, a first echo canceller to cancel a first echo signal from the first signal, wherein the first echo signal is received in a second direction; after training the first echo canceller, enabling, by the computing device, the trained first echo canceller; receiving, by the computing device, a second signal in the second direction that is sent in the second direction in the network; amplifying, by the computing device, the second signal in the second direction; and training, by the computing device, a second echo canceller to cancel a second echo signal received in the first direction from the second signal, wherein the first echo canceller cancels the first echo signal that is received in the second direction.

In some embodiments, the first direction is a downstream direction towards a network device, and the second direction is an upstream direction towards a node, wherein the first signal is received from the node for the network device, and the second signal is received from the network device for the node.

In some embodiments, training the first echo canceller to cancel the first echo signal from the first signal comprises: forwarding upstream idle grants to one or more network devices to limit upstream transmissions from the one or more network devices.

In some embodiments, training the first echo canceller to cancel the first echo signal from the first signal comprises: receiving the first signal; receiving the first echo signal; and training the first echo canceller based on characteristics of the first signal and the first echo signal.

In some embodiments, training the first echo canceller based on the characteristics of the first signal and the first echo signal comprises: correlating a magnitude or a phase of the first signal to the first echo signal.

In some embodiments, training the first echo canceller based on the characteristics of the first signal and the first echo signal comprises: removing any of the second echo signal that results from receiving the second signal.

In some embodiments, training the second echo canceller to cancel the second echo signal received in the first direction from the second signal comprises: forwarding messages to configure one or more network devices to transmit in the second direction.

In some embodiments, training the second echo canceller to cancel the second echo signal received in the first direction from the second signal comprises: enabling the trained first echo canceller to cancel the first echo signal while training the second echo canceller.

In some embodiments, the first echo canceller cancels the first echo signal that results from downstream energy while training the second echo canceller.

In some embodiments, training the second echo canceller to cancel the second echo signal received in the first direction from the second signal comprises: receiving the second signal; receiving the second echo signal; and training the second echo canceller based on characteristics of the second signal and the second echo signal.

In some embodiments, training the second echo canceller based on the characteristics of the second signal and the second echo signal comprises: correlating a magnitude or a phase of the second signal to the second echo signal.

In some embodiments, training the second echo canceller based on the characteristics of the second signal and the second echo signal comprises: removing a portion of the first echo signal that results from receiving the first signal.

In some embodiments, characteristics of the second signal are a known signal that is transmitted by a network device and are used to remove a portion of the first echo signal.

In some embodiments, characteristics of the second signal are sampled from a transmission by a network device.

In some embodiments, a non-transitory computer-readable storage medium containing instructions that, when executed, control a computer system to be operable for: receiving a first signal that is sent in a first direction in a network, wherein communications in the network are full duplex communications in a same frequency band; amplifying the first signal in the first direction; training a first echo canceller to cancel a first echo signal from the first signal, wherein the first echo signal is received in a second direction; after training the first echo canceller, enabling the trained first echo canceller; receiving a second signal in the second direction that is sent in the second direction in the network; amplifying the second signal in the second direction; and training a second echo canceller to cancel a second echo signal received in the first direction from the second signal, wherein the first echo canceller cancels the first echo signal that is received in the second direction.

In some embodiments, the first direction is a downstream direction towards a network device, and the second direction is an upstream direction towards a node, wherein the first signal is received from the node for the network device, and the second signal is received from the network device for the node.

In some embodiments, training the first echo canceller to cancel the first echo signal from the first signal comprises: forwarding upstream idle grants to one or more network devices to limit upstream transmissions from the one or more network devices.

In some embodiments, training the first echo canceller to cancel the first echo signal from the first signal comprises: receiving the first signal; receiving the first echo signal; and training the first echo canceller based on characteristics of the first signal and the first echo signal.

In some embodiments, training the second echo canceller to cancel the second echo signal received in the first direction from the second signal comprises: forwarding messages to configure one or more network devices to transmit in the second direction.

In some embodiments, an apparatus comprising: one or more computer processors; and a non-transitory computer-readable storage medium comprising instructions, that when executed, control the one or more computer processors to be operable for: receiving a first signal that is sent in a first direction in a network, wherein communications in the network are full duplex communications in a same frequency band; amplifying the first signal in the first direction; training a first echo canceller to cancel a first echo signal from the first signal, wherein the first echo signal is received in a second direction; after training the first echo canceller, enabling the trained first echo canceller; receiving a second signal in the second direction that is sent in the second direction in the network; amplifying the second signal in the second direction; and training a second echo canceller to cancel a second echo signal received in the first direction from the second signal, wherein the first echo canceller cancels the first echo signal that is received in the second direction.

System

Figure 7:
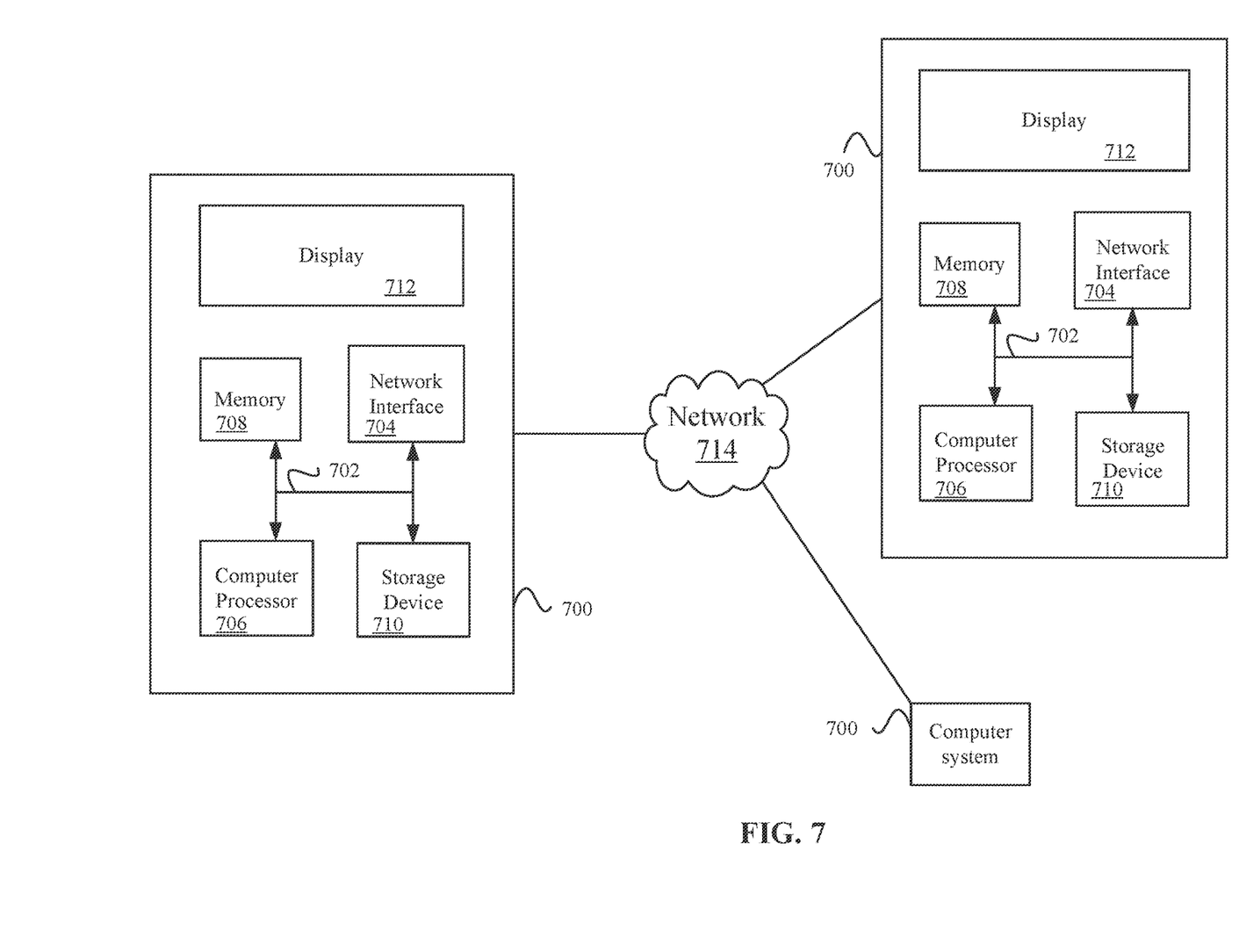
FIG. 7 illustrates an example of special purpose computer systems according to some embodiments.

FIG. 7 illustrates an example of special purpose computer systems 700 according to some embodiments. Computer system 700 includes a bus 702, network interface 704, a computer processor 706, a memory 708, a storage device 710, and a display 712.

Bus 702 may be a communication mechanism for communicating information.

Computer processor 706 may execute computer programs stored in memory 708 or storage device 710. Any suitable programming language can be used to implement the routines of some embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device X10 may be a database that is accessed by computer system X00. Other examples of storage device X10 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by some embodiments. The instructions, when executed by one or more computer processors 706, may be configured to perform that which is described in some embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of some embodiments may be distributed across computer systems 700 through network 714.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a first signal that is sent in a first direction in a network, wherein communications in the network are full duplex communications in a same frequency band;
amplifying, by the computing device, the first signal in the first direction;
training, by the computing device, a first echo canceller to cancel a first echo signal from the first signal, wherein the first echo signal is received in a second direction;
after training the first echo canceller, enabling, by the computing device, the trained first echo canceller;
receiving, by the computing device, a second signal in the second direction that is sent in the second direction in the network;
amplifying, by the computing device, the second signal in the second direction; and
training, by the computing device, a second echo canceller to cancel a second echo signal received in the first direction from the second signal, wherein the first echo canceller cancels the first echo signal that is received in the second direction.

2. The method of claim 1, wherein:
the first direction is a downstream direction towards a network device, and
the second direction is an upstream direction towards a node, wherein the first signal is received from the node for the network device, and the second signal is received from the network device for the node.

3. The method of claim 1, wherein training the first echo canceller to cancel the first echo signal from the first signal comprises:
forwarding upstream idle grants to one or more network devices to limit upstream transmissions from the one or more network devices.

4. The method of claim 1, wherein training the first echo canceller to cancel the first echo signal from the first signal comprises:
receiving the first signal;
receiving the first echo signal; and
training the first echo canceller based on characteristics of the first signal and the first echo signal.

5. The method of claim 4, wherein training the first echo canceller based on the characteristics of the first signal and the first echo signal comprises:
correlating a magnitude or a phase of the first signal to the first echo signal.

6. The method of claim 4, wherein training the first echo canceller based on the characteristics of the first signal and the first echo signal comprises:
removing any of the second echo signal that results from receiving the second signal.

7. The method of claim 1, wherein training the second echo canceller to cancel the second echo signal received in the first direction from the second signal comprises:
forwarding messages to configure one or more network devices to transmit in the second direction.

8. The method of claim 1, wherein training the second echo canceller to cancel the second echo signal received in the first direction from the second signal comprises:

enabling the trained first echo canceller to cancel the first echo signal while training the second echo canceller.

9. The method of claim 8, wherein the first echo canceller cancels the first echo signal that results from downstream energy while training the second echo canceller.

10. The method of claim 1, wherein training the second echo canceller to cancel the second echo signal received in the first direction from the second signal comprises:
receiving the second signal;
receiving the second echo signal; and
training the second echo canceller based on characteristics of the second signal and the second echo signal.

11. The method of claim 10, wherein training the second echo canceller based on the characteristics of the second signal and the second echo signal comprises:
correlating a magnitude or a phase of the second signal to the second echo signal.

12. The method of claim 10, wherein training the second echo canceller based on the characteristics of the second signal and the second echo signal comprises:
removing a portion of the first echo signal that results from receiving the first signal.

13. The method of claim 10, wherein characteristics of the second signal are a known signal that is transmitted by a network device and are used to remove a portion of the first echo signal.

14. The method of claim 10, wherein characteristics of the second signal are sampled from a transmission by a network device.

15. A non-transitory computer-readable storage medium containing instructions that, when executed, control a computer system to be operable for:
receiving a first signal that is sent in a first direction in a network, wherein communications in the network are full duplex communications in a same frequency band;
amplifying the first signal in the first direction;
training a first echo canceller to cancel a first echo signal from the first signal, wherein the first echo signal is received in a second direction;
after training the first echo canceller, enabling the trained first echo canceller;
receiving a second signal in the second direction that is sent in the second direction in the network;
amplifying the second signal in the second direction; and
training a second echo canceller to cancel a second echo signal received in the first direction from the second signal, wherein the first echo canceller cancels the first echo signal that is received in the second direction.

16. The non-transitory computer-readable storage medium of claim 15, wherein:
the first direction is a downstream direction towards a network device, and
the second direction is an upstream direction towards a node, wherein the first signal is received from the node for the network device, and the second signal is received from the network device for the node.

17. The non-transitory computer-readable storage medium of claim 15, wherein training the first echo canceller to cancel the first echo signal from the first signal comprises:
forwarding upstream idle grants to one or more network devices to limit upstream transmissions from the one or more network devices.

18. The non-transitory computer-readable storage medium of claim 15, wherein training the first echo canceller to cancel the first echo signal from the first signal comprises:
receiving the first signal;
receiving the first echo signal; and
training the first echo canceller based on characteristics of the first signal and the first echo signal.

19. The non-transitory computer-readable storage medium of claim 15, wherein training the second echo canceller to cancel the second echo signal received in the first direction from the second signal comprises:
forwarding messages to configure one or more network devices to transmit in the second direction.

20. An apparatus comprising:
one or more computer processors; and
a non-transitory computer-readable storage medium comprising instructions, that when executed, control the one or more computer processors to be operable for:
receiving a first signal that is sent in a first direction in a network, wherein communications in the network are full duplex communications in a same frequency band;
amplifying the first signal in the first direction;
training a first echo canceller to cancel a first echo signal from the first signal, wherein the first echo signal is received in a second direction;
after training the first echo canceller, enabling the trained first echo canceller;
receiving a second signal in the second direction that is sent in the second direction in the network;
amplifying the second signal in the second direction; and
training a second echo canceller to cancel a second echo signal received in the first direction from the second signal, wherein the first echo canceller cancels the first echo signal that is received in the second direction.

* * * * *